US00RE47126E

(19) United States
(12) Reissued Patent
Liu et al.

(10) Patent Number: US RE47,126 E
(45) Date of Reissued Patent: Nov. 13, 2018

(54) SYSTEMS AND METHODS FOR PUCCH FEEDBACK IN 3GPP WIRELESS NETWORKS

(71) Applicant: Samsung Electronics Co., Ltd., Suwon-si, Gyeonggi-do (KR)

(72) Inventors: Lingjia Liu, Allen, TX (US); Jianzhong Zhang, Plano, TX (US); Young-Han Nam, Plano, TX (US)

(73) Assignee: Samsung Electronics Co., Ltd., Suwon-Si (KR)

(21) Appl. No.: 14/957,358

(22) Filed: Dec. 2, 2015

Related U.S. Patent Documents

Reissue of:
(64) Patent No.: 8,599,761
Issued: Dec. 3, 2013
Appl. No.: 13/104,644
Filed: May 10, 2011

U.S. Applications:
(60) Provisional application No. 61/334,685, filed on May 14, 2010.

(51) Int. Cl.

| | |
|---|---|
| ***H04W 4/00*** | (2018.01) |
| ***H04B 7/06*** | (2006.01) |
| ***H04B 7/0456*** | (2017.01) |
| ***H04L 1/00*** | (2006.01) |
| ***H04B 7/0417*** | (2017.01) |

(52) U.S. Cl.
CPC ..... *H04B 7/0632* (2013.01); *H04B 7/0417* (2013.01); *H04B 7/0478* (2013.01); *H04B 7/0639* (2013.01); *H04L 1/0026* (2013.01); *H04L 1/0027* (2013.01); *H04L 1/0028* (2013.01)

(58) Field of Classification Search
CPC ... H04B 7/0417; H04B 7/0632; H04L 1/0029; H04L 5/001
USPC ..... 370/328, 203, 329, 336
See application file for complete search history.

(56) References Cited

U.S. PATENT DOCUMENTS 7,978,623 B1 * 7/2011 Kotecha ..... 370/252
8,358,585 B2 * 1/2013 Chung ..... H04B 7/0417 370/230

(Continued)

FOREIGN PATENT DOCUMENTS

CN 101512927 A 8/2009
EP 2184877 A1 5/2010

(Continued)

OTHER PUBLICATIONS

Translated Notification of Decision to Grant dated Jan. 29, 2016 in connection with Japanese Patent Application No. 2013-511101, 6 pages.

(Continued)

*Primary Examiner* — John M Hotaling

(57) ABSTRACT

A mobile station for use in a wireless network. The mobile station transmits feedback values in a physical uplink control channel (PUCCH) to a base station of the wireless network. The mobile station is operable to transmit to the base station a subband second precoder matrix index (PMI) associated with a particular subband and a subband channel quality indicator (CQI) value associated with the particular subband together in a subframe of the PUCCH.

32 Claims, 4 Drawing Sheets

(56) References Cited

U.S. PATENT DOCUMENTS

| | | | | |
|---|---|---|---|---|
| 2008/0233965 | A1 | 9/2008 | Kent et al. | |
| 2009/0006925 | A1 | 1/2009 | Pan | |
| 2009/0017769 | A1 | 1/2009 | Chen et al. | |
| 2009/0046569 | A1* | 2/2009 | Chen | H04L 1/0029 370/203 |
| 2009/0190528 | A1* | 7/2009 | Chung et al. | H04B 7/0417 370/328 |
| 2009/0207784 | A1 | 8/2009 | Lee et al. | |
| 2010/0067461 | A1* | 3/2010 | Kwak | H04L 1/0026 370/329 |
| 2010/0067616 | A1 | 3/2010 | Chun et al. | H04B 7/063 375/295 |
| 2010/0098012 | A1* | 4/2010 | Bala | H04L 5/001 370/329 |
| 2010/0226327 | A1* | 9/2010 | Zhang | H04B 7/0632 370/329 |
| 2010/0260154 | A1* | 10/2010 | Frank | G01S 5/10 370/336 |
| 2010/0273499 | A1* | 10/2010 | van Rensburg | H04W 72/1231 455/450 |
| 2010/0310000 | A1* | 12/2010 | Ko | H04B 7/0617 375/260 |
| 2011/0009148 | A1* | 1/2011 | Kotecha | 455/513 |
| 2011/0077040 | A1* | 3/2011 | Nammi | H04W 4/20 455/507 |
| 2011/0081901 | A1* | 4/2011 | Moulsley et al. | 455/422.1 |
| 2011/0141928 | A1* | 6/2011 | Shin et al. | 370/252 |
| 2011/0200131 | A1* | 8/2011 | Gao | H04B 7/0452 375/267 |
| 2011/0249637 | A1* | 10/2011 | Hammarwall et al. | H04B 7/0634 370/329 |
| 2011/0249713 | A1 | 10/2011 | Hammarwall et al. | |
| 2011/0294713 | A1* | 10/2011 | Hammarwall et al. | 375/220 |
| 2011/0317652 | A1* | 12/2011 | Kim | H04L 5/001 370/329 |
| 2012/0069917 | A1* | 3/2012 | Liu et al. | 375/259 |
| 2012/0076028 | A1* | 3/2012 | Ko et al. | 370/252 |
| 2013/0022146 | A1* | 1/2013 | Chen | H04L 25/03898 375/267 |
| 2013/0088981 | A1* | 4/2013 | Lv | H04L 1/0681 370/252 |

FOREIGN PATENT DOCUMENTS

| | | | |
|---|---|---|---|
| JP | 2011-509018 | | 3/2011 |
| JP | 2011-526462 | | 10/2011 |
| WO | WO 2009/088225 | A2 | 7/2009 |
| WO | 2009/096708 | A1 | 8/2009 |
| WO | WO 2009/158481 | A2 | 12/2009 |

OTHER PUBLICATIONS

Samsung, Control Signaling to Support Feedback Enhancements in Rel. 10, 63GTPP TSG RAN WG1 Meeting #61, R1-103028, Montreal, Canada, May 10-14, 2010, 12 pages.

Samsung, "Performance Evaluations of Rel. 10 4Tx Feedback Enhancement", 3GPP TSG RAN WG1 Meeting #62, R1-105049, Madrid, Spain, Aug. 23-27, 2010, 19 pages.

"DL Codebook for 8 Tx," 3GPP TSG RAN WG1#61, Huawei, R1-103105, Montreal, Canada, May 10-14, 2010, 8 pages.

"Control Signaling to Support Rel. 10 Feedback Framework," 3GPP TSG RAN WG1 Meeting #6 1bis, Samsung, R1-103667, Dresden, Germany, Jun. 28-Jul. 2, 2010, 14 pages.

"Data and Control Multiplexing for UL Multi-Antenna Transmission," 3GPP TSG RAN WG1 60bis, Texas Instruments, R1-102108, Beijing, China, Apr. 12-16, 2010, 4 pages.

Foreign Communication From A Related Counterpart Application, Korean Application No. 10-2012-7029784, Notification of Preliminary Rejection dated Feb. 13, 2017, 10 pages.

Foreign Communication From A Related Counterpart Application, Japanese Application No. 2016-046081, Notice of Reasons for Refusal dated Dec. 5, 2016, 7 pages.

Supplemental Partial European Search Report dated Jun. 1, 2017 in connection with European Patent Application No. EP 11 78 0815.

Notification of Decision to Grant a Patent dated Apr. 25, 2017 in connection with Korean Patent Application No. 10-2012-7029784.

International Search Report dated Feb. 6, 2012 in connection with International Patent Application No. PCT/KR2011/003498; 3 pp.

Spencer, Q., et al., "An Introduction to the Multi-User MIMO Downlink," Adaptive Antennas and MIMO Systems for Wireless Communications, IEEE Communications Magazine, Oct. 2004, pp. 60-67.

Extended European Search Report for European Application No. 11780815.4, dated Oct. 17, 2017. (15 pages).

Chinese Office Action for Chinese Application No. 2015105143260, dated Nov. 3, 2017. (17 pages).

European Patent Office Communication regarding application No. 11780815.4, dated Aug. 29, 2018, 6 pages.

ZTE, "Discussion on unified framework for multi-granular feedback", 3GPP TSG RAN WG1 Meeting #60bis, R1-101838, Apr. 2010, 6 pages.

Texas Instruments, "Possible Refinement on 8Tx Codebook ", 3GPP TSG RAN WG1 Meeting #60bis, R1-102104, Apr. 2010, 7 pages.

* cited by examiner

SYSTEMS AND METHODS FOR PUCCH FEEDBACK IN 3GPP WIRELESS NETWORKS

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATION(S) AND CLAIM OF PRIORITY

The present application is [related to] *an application for reissue of U.S. Pat. No. 8,599,761, issued Dec. 3, 2013 on U.S. Non-Provisional patent application Ser. No. 13/104,644 filed May 10, 2011, and claims the priority to and the benefit under 35 U.S.C. § 119(e) of the filing date of* U.S. Provisional Patent Application No. 61/334,685, filed May 14, 2010, entitled "PUCCH CQI/PMI/RI FEEDBACK IN REL-10". [Provisional Patent Application No. 61/334,685 is assigned to the assignee of the present application and] *The content of the above-identified patent documents* is hereby incorporated by reference into the present application as if fully set forth herein. [The present application hereby claims priority under 35 U.S.C. §119(e) to U.S. Provisional Patent Application No. 61/334,685.]

TECHNICAL FIELD OF THE INVENTION

The present application relates generally to wireless networks and, more specifically, to the CQI, PMI, and RI feedback mechanism for the physical uplink control channel (PUCCH) in Release 10 of 3GPP wireless networks.

BACKGROUND OF THE INVENTION

In 3rd Generation Partnership Project Long Term Evolution (3GPP LTE), Orthogonal Frequency Division Multiplexing (OFDM) is adopted as a downlink (DL) transmission scheme.

The 3GPP LTE (Long Term Evolution) standard is the last stage in the realization of true 4th generation (4G) mobile telephone networks. Most major mobile carriers in the United States and several worldwide carriers have announced plans to convert their networks to LTE beginning in 2009. LTE is a set of enhancements to the Universal Mobile Telecommunications System (UMTS). Much of 3GPP Release 8 focuses on adopting 4G mobile communications technology, including an all-IP flat networking architecture.

The 3GPP LTE standard uses orthogonal frequency division multiplexing (OFDM) for the downlink (i.e., from the base station to the mobile station). Orthogonal frequency division multiplexing (OFDM) is a multi-carrier transmission technique that transmits on many orthogonal frequencies (or subcarriers). The orthogonal subcarriers are individually modulated and separated in frequency such that they do not interfere with one another. This provides high spectral efficiency and resistance to multipath effects.

The following documents and standards descriptions are hereby incorporated into the present disclosure as if fully set forth herein: 1) Document No. R1-101683, "Way Forward For Rel-10 Feedback Framework", February 2010; 2) Document No. R1-102579, "Way Forward On Release 10 Feedback", RAN WG1, April 2010; and 3) Document No. R1-103332, "Way Forward On UE Feedback", May 2010.

In Release 10 LTE systems, a mobile station (or user equipment) performs feedback of precoder matrix index (PMI), rank indicator (RI), and channel quality indicator (CQI) to the base station (or eNodeB). In the 3GPP RAN1 #60 meeting, a way forward on feedback in Release 10 was agreed upon. Release 10 uses implicit feedback of precoder matrix index (PMI), rank indicator (RI), and channel quality indicator (CQI). The user equipment (UE) or mobile station (MS) spatial feedback for a subband represents a precoder and CQI is computed based on the assumption that the eNodeB or base station (BS) uses a specific precoder (or precoders), as given by the feedback, on each subband within the CQI reference resource. It is noted that a subband may correspond to the whole system bandwidth.

A precoder for a subband is composed of two matrices. The precoder structure is applied to all transmit (Tx) antenna array configurations. Each of the two matrices belongs to a separate codebook. The codebooks are known (or synchronized) at both the base station (eNodeB) and the mobile station (user equipment). Codebooks may or may not change over time for different subbands. The two codebook indices together determine the precoder. One of the two matrices targets the wideband or long-term channel properties. The other matrix targets the frequency-selective or short-term channel properties. It is noted that a matrix codebook in this context should be interpreted as a finite, enumerated set of matrices that, for each resource block (RB), is known to both the mobile station (or UE) and the base station (or eNodeB). It is also noted that that a Release 8 precoder feedback may be deemed a special case of this structure.

Two messages are conveyed in this way: 1) Release 10 feedback will be based on implicit feedback similar to Release 8 feedback; and 2) two codebook indices will specify a precoder in Release 10, with one codebook targeting wideband and/or long-term channel properties and the other codebook targeting frequency-selective and/or short-term channel properties.

In the RAN1 #60bis meeting, another way forward on mobile station (or UE) feedback in Release 10 was also agreed upon. A precoder, W, for a subband is a function of two matrices, W1 and W2, (i.e., where $W1 \epsilon C1$ and $W2 \epsilon C2$). W1 is also referred to as a first PMI, and W2 is also referred to as a second PMI in this disclosure. The codebooks C1 and C2 are codebook 1 and codebook 2, respectively. The first PMI targets wideband (or long-term) channel properties. The second PMI targets frequency-selective (or short-term) channel properties. For the physical uplink control channel (PUCCH), the feedback corresponding to the first PMI and the second PMI may be sent in different or the same subframe, unless the payload is too large to send the first PMI and the second PMI in the same subframe on PUCCH. Also, periodic and aperiodic reports are independent.

Thus, there is an important difference in feedback between Release 8 (Rel-8) and Release 10 (Rel-10) of 3GPP networks. In Release 8, only one codebook index specifies a precoder. However, in Release 10, two codebook indices specify a precoder. Furthermore, these two codebook indices in Release 10 may be sent in different subframes or in the same subframe.

Based on current discussions in RAN1 group about the refinement of UE feedback, there are two possible ways of performing precoding: 1) $W=W1 \times W2$ or 2) $W=W2 \times W1$, with W1 or the first PMI targeting wideband/long-term channel properties and W2 or the second PMI targeting frequency-selective/short-term channel properties. It is likely that the Rel-10 feedback mechanism will be largely different from that of Rel-8 feedback scheme based on the two codebook structure. Furthermore, the design philosophy of the corresponding feedback mechanisms should be tailored towards detailed ways of performing matrix multiplication of the corresponding two codebook matrices.

Therefore, there is a need in the art for improved devices and methods for providing feedback information related to CQI, PMI, and RI in Rel-10 wireless networks based on the double codebook structure for both physical uplink control channel (PUCCH) periodic feedback and physical uplink shared channel (PUSCH) aperiodic feedback. In particular, there is a need in the art for improved devices and methods for providing feedback information related to CQI, PMI, and RI in Rel-10 wireless networks that minimize overhead signaling while improving the granularity of the feedback information.

SUMMARY OF THE INVENTION

To address the above-discussed deficiencies of the prior art, it is a primary object to provide, for use in a wireless network, a mobile station that transmits feedback values in a physical uplink control channel (PUCCH) to a base station of the wireless network. The mobile station is operable to transmit to the base station a subband second precoder matrix index (PMI) associated with a particular subband and a subband channel quality indicator (CQI) value associated with the particular subband together in a subframe of the PUCCH.

A method of operating a mobile station is provided. The method includes transmitting to a base station a subband second precoder matrix index (PMI) associated with a particular subband and a subband channel quality indicator (CQI) value associated with the particular subband together in a subframe of a physical uplink control channel (PUCCH).

For use in a wireless network capable of communicating with mobile stations, a base station is provided that is operable to receive from a mobile station feedback values transmitted in a physical uplink control channel (PUCCH). The base station is operable to receive a subband second precoder matrix index (PMI) associated with a particular subband and a subband channel quality indicator (CQI) value associated with the particular subband together in a subframe of the PUCCH.

A method of operating a base station is provided. The method includes receiving from a mobile station a subband second precoder matrix index (PMI) associated with a particular subband and a subband channel quality indicator (CQI) value associated with the particular subband together in a subframe of a physical uplink control channel (PUCCH).

For use in a wireless network, a mobile station that transmits precoder matrix index (PMI) values to a base station in a physical uplink control channel (PUCCH), the PMI values being associated with a PUCCH codebook. The mobile station also transmits the PMI values to the base station in a physical uplink shared channel (PUSCH), the PMI values being associated with a PUSCH codebook. The PUCCH codebook is a subset of the PUSCH codebook.

A method of operating a mobile station is provided. The method includes transmitting precoder matrix index (PMI) values to a base station in a physical uplink control channel (PUCCH), the PMI values being associated with a PUCCH codebook. The method also includes transmitting the PMI values to the base station in a physical uplink shared channel (PUSCH), the PMI values being associated with a PUSCH codebook. The PUCCH codebook is a subset of the PUSCH codebook.

For use in a wireless network capable of communicating with mobile stations, a base station is operable receive precoder matrix index (PMI) values from a mobile station in a physical uplink control channel (PUCCH), the PMI values being associated with a PUCCH codebook. The base station also is operable to receive the PMI values from the mobile station in a physical uplink shared channel (PUSCH), the PMI values being associated with a PUSCH codebook. The PUCCH codebook is a subset of the PUSCH codebook.

A method of operating a base station is provided. The method includes receiving precoder matrix index (PMI) values from a mobile station in a physical uplink control channel (PUCCH), the PMI values being associated with a PUCCH codebook. The method also includes receiving the PMI values from the mobile station in a physical uplink shared channel (PUSCH), the PMI values being associated with a PUSCH codebook. The PUCCH codebook is a subset of the PUSCH codebook.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

FIGS. 1 through 10, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless network.

Figure 1:
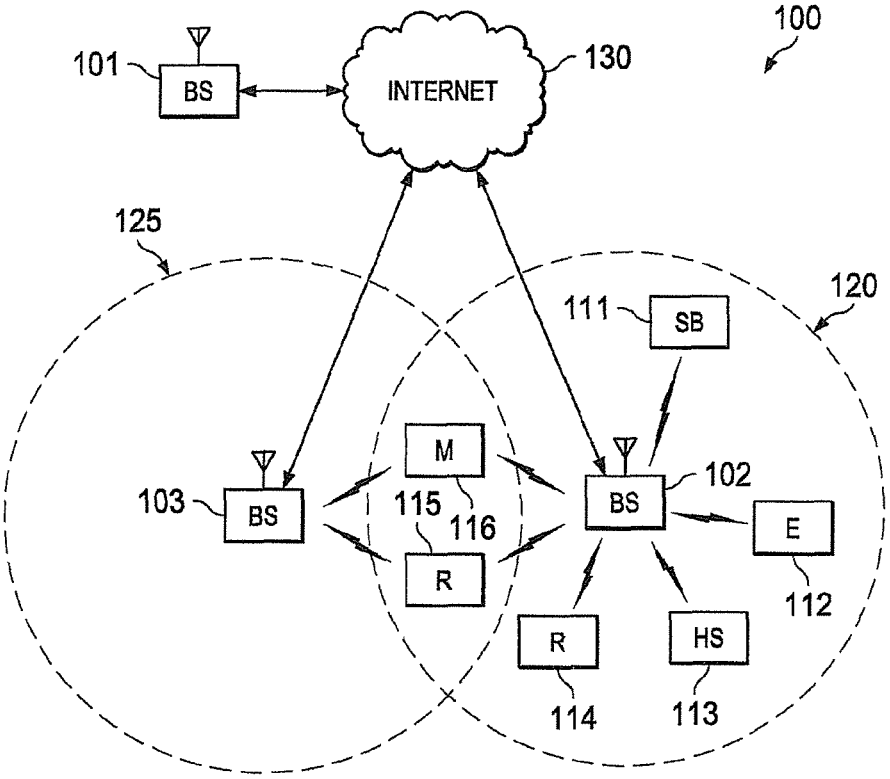
FIG. 1 illustrates an exemplary wireless network that performs feedback for the PUCCH and the PUSCH according to the principles of the present disclosure.

FIG. 1 illustrates exemplary wireless network 100, which performs feedback for the physical uplink control channel (PUCCH) and physical uplink shared channel (PUSCH) according to the principles of the present disclosure. In the illustrated embodiment, wireless network 100 includes base station (BS) 101, base station (BS) 102, base station (BS) 103, and other similar base stations (not shown). Base station 101 is in communication with Internet 130 or a similar IP-based network (not shown).

Depending on the network type, other well-known terms may be used instead of "base station," such as "eNodeB" or "access point". For the sake of convenience, the term "base station" shall be used herein to refer to the network infrastructure components that provide wireless access to remote terminals.

Base station 102 provides wireless broadband access to Internet 130 to a first plurality of mobile stations (or user equipment) within coverage area 120 of base station 102. The first plurality of mobile stations includes mobile station 111, which may be located in a small business (SB), mobile station 112, which may be located in an enterprise (E), mobile station 113, which may be located in a WiFi hotspot (HS), mobile station 114, which may be located in a first residence (R), mobile station 115, which may be located in a second residence (R), and mobile station 116, which may be a mobile device (M), such as a cell phone, a wireless laptop, a wireless PDA, or the like.

For sake of convenience, the term "mobile station" is used herein to designate any remote wireless equipment that wirelessly accesses a base station, whether or not the mobile station is a truly mobile device (e.g., cell phone) or is normally considered a stationary device (e.g., desktop personal computer, vending machine, etc.). Other well-known terms may be used instead of "mobile station", such as "subscriber station (SS)", "remote terminal (RT)", "wireless terminal (WT)", "user equipment (UE)", and the like.

Base station 103 provides wireless broadband access to Internet 130 to a second plurality of mobile stations within coverage area 125 of base station 103. The second plurality of mobile stations includes mobile station 115 and mobile station 116. In an exemplary embodiment, base stations 101-103 may communicate with each other and with mobile stations 111-116 using OFDM or OFDMA techniques.

While only six mobile stations are depicted in FIG. 1, it is understood that wireless network 100 may provide wireless broadband access to additional mobile stations. It is noted that mobile station 115 and mobile station 116 are located on the edges of both coverage area 120 and coverage area 125. Mobile station 115 and mobile station 116 each communicate with both base station 102 and base station 103 and may be said to be operating in handoff mode, as known to those of skill in the art.

Exemplary descriptions of closed-loop transmit beamforming schemes based on codebook design can be found in: 1) D. Love, J. Heath, and T. Strohmer, "Grassmannian Beamforming For Multiple-Input, Multiple-Output Wireless Systems," IEEE Transactions on Information Theory, October 2003, and 2) V. Raghavan, A. M. Sayeed, and N. Boston, "Near-Optimal Codebook Constructions For Limited Feedback Beamforming In Correlated MIMO Channels With Few Antennas," IEEE 2006 International Symposium on Information Theory. Both references are hereby incorporated by reference into this disclosure as if fully set forth herein.

Closed-loop codebook-based transmit beamforming may be used in a case where a base station forms a transmit antenna beam toward a single user or simultaneously toward multiple users at the same time and at a certain frequency. An exemplary description of such a system may be found in Quentin H. Spencer, Christian B. Peel, A. Lee Swindlehurst, Martin Harrdt, "An Introduction To the Multi-User MIMO Downlink," IEEE Communication Magazine, October 2004, which is hereby incorporated by reference into this disclosure as if fully set forth herein.

A codebook is a set of pre-determined antenna beams that are known to mobile stations. A codebook-based pre-coding MIMO may provide significant spectral efficiency gain in the downlink closed-loop MIMO. In the IEEE 802.16e and 3GPP LTE standards, a four transmit (4-TX) antenna limited feedback based closed-loop MIMO configuration is supported. In IEEE 802.16m and 3GPP LTE Advanced standards, in order to provide peak spectral efficiency, eight transmit (8-TX) antenna configurations are proposed as a prominent precoding closed-loop MIMO downlink system. Exemplary descriptions of such systems may be found in 3GPP Technical Specification No. 36.211, "Evolved Universal Terrestrial Radio Access (E-UTRA): Physical Channel and Modulation", which is hereby incorporated by reference into this disclosure as if fully set forth herein.

To eliminate the need for the phase calibration process in cases where channel sounding signals or common pilot signals (or midamble) are not used for data demodulation purpose, closed-loop transformed codebook-based transmit beamforming may be utilized. An exemplary description of such a system may be found in IEEE C802.16m-08/1345r2, "Transformation Method For Codebook Based Precoding," November 2008, which is hereby incorporated by reference into this disclosure as if fully set forth herein. The transformed codebook method utilizes the channel correlation information to enhance the performance of the standard codebook, especially in the highly correlated channels, as well as to eliminate the need of phase calibration among multiple transmit antennas. Typically, the channel correlation information is based on second-order statistics and thus changes very slowly, which is similar to long-term channel effects, such as shadowing and path loss. As a result, the feedback overhead and computation complexity using correlation information are very small.

Figure 2:
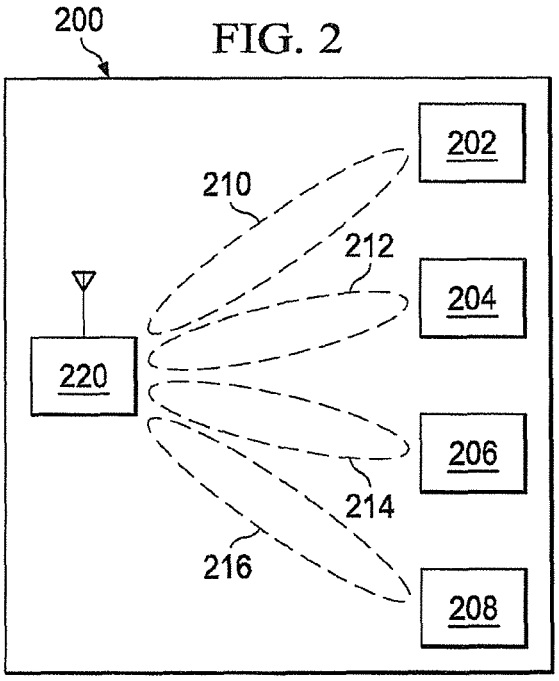
FIG. 2 illustrates a base station in communication with a plurality of mobile stations according to an embodiment of the disclosure.

FIG. 2 illustrates a diagram 200 of a base station 220 in communication with a plurality of mobile stations 202, 204, 206, and 208 according to an embodiment of this disclosure.

As shown in FIG. 2, base station 220 simultaneously communicates with multiple of mobile stations through the use of multiple antenna beams, each antenna beam is formed toward its intended mobile station at the same time and same frequency. Base station 220 and mobile stations 202, 204, 206, and 208 employ multiple antennas for transmission and reception of radio wave signals. The radio wave signals can be Orthogonal Frequency Division Multiplexing (OFDM) signals.

In this embodiment, base station 220 performs simultaneous beamforming through a plurality of transmitters to each mobile station. For instance, base station 220 transmits data to mobile station 202 through a beamformed signal 210, data to mobile station 204 through a beamformed signal 212, data to mobile station 406 through a beamformed signal 214, and data to mobile station 408 through a beamformed signal 216. In some embodiments of this disclosure, base station 220 is capable of simultaneously beamforming to the mobile stations 202, 204, 206, and 208. In some embodiments, each beamformed signal is formed toward its intended mobile station at the same time and the same frequency. For the purpose of clarity, the communication from a base station to a mobile station may also be referred to as downlink communication and the communication from a mobile station to a base station may be referred to as uplink communication.

Base station 220 and mobile stations 202, 204, 206, and 208 employ multiple antennas for transmitting and receiving wireless signals. It is understood that the wireless signals may be radio wave signals, and the wireless signals may use any transmission scheme known to one skilled in the art, including an Orthogonal Frequency Division Multiplexing (OFDM) transmission scheme.

Mobile stations 202, 204, 206, and 208 may be any device that is capable receiving wireless signals. Examples of mobile stations 202, 204, 206, and 208 include, but are not limited to, a personal data assistant (PDA), laptop, mobile telephone, handheld device, or any other device that is capable of receiving the beamformed transmissions.

The OFDM transmission scheme is used to multiplex data in the frequency domain. Modulation symbols are carried on frequency sub-carriers. The quadrature amplitude modulation (QAM) modulated symbols are serial-to-parallel converted and input to the inverse fast Fourier transform (IFFT). At the output of the IFFT, N time-domain samples are obtained. Here N refers to the IFFT/fast Fourier transform (FFT) size used by the OFDM system. The signal after IFFT is parallel-to-serial converted and a cyclic prefix (CP) is added to the signal sequence. The CP is added to each OFDM symbol to avoid or mitigate the impact due to multipath fading. The resulting sequence of samples is referred to as an OFDM symbol with a CP. At the receiver side, assuming that perfect time and frequency synchronization are achieved, the receiver first removes the CP, and the signal is serial-to-parallel converted before being fed into the FFT. The output of the FFT is parallel-to-serial converted, and the resulting QAM modulation symbols are input to the QAM demodulator.

The total bandwidth in an OFDM system is divided into narrowband frequency units called subcarriers. The number of subcarriers is equal to the FFT/IFFT size N used in the system. In general, the number of subcarriers used for data is less than N because some subcarriers at the edge of the frequency spectrum are reserved as guard subcarriers. In general, no information is transmitted on guard subcarriers.

Because each OFDM symbol has finite duration in time domain, the sub-carriers overlap with each other in frequency domain. However, the orthogonality is maintained at the sampling frequency assuming the transmitter and receiver have perfect frequency synchronization. In the case of frequency offset due to imperfect frequency synchronization or high mobility, the orthogonality of the sub-carriers at sampling frequencies is destroyed, resulting in inter-carrier-interference (ICI).

The use of multiple transmit antennas and multiple receive antennas at both a base station and a single mobile station to improve the capacity and reliability of a wireless communication channel is known as a Single User Multiple Input Multiple Output (SU-MIMO) system. A MIMO system promises linear increase in capacity with K, where K is the minimum of number of transmit (M) and receive antennas (N) (i.e., K=min(M,N)). A MIMO system can be implemented with the schemes of spatial multiplexing, a transmit/receive beamforming, or transmit/receive diversity.

Figure 3:
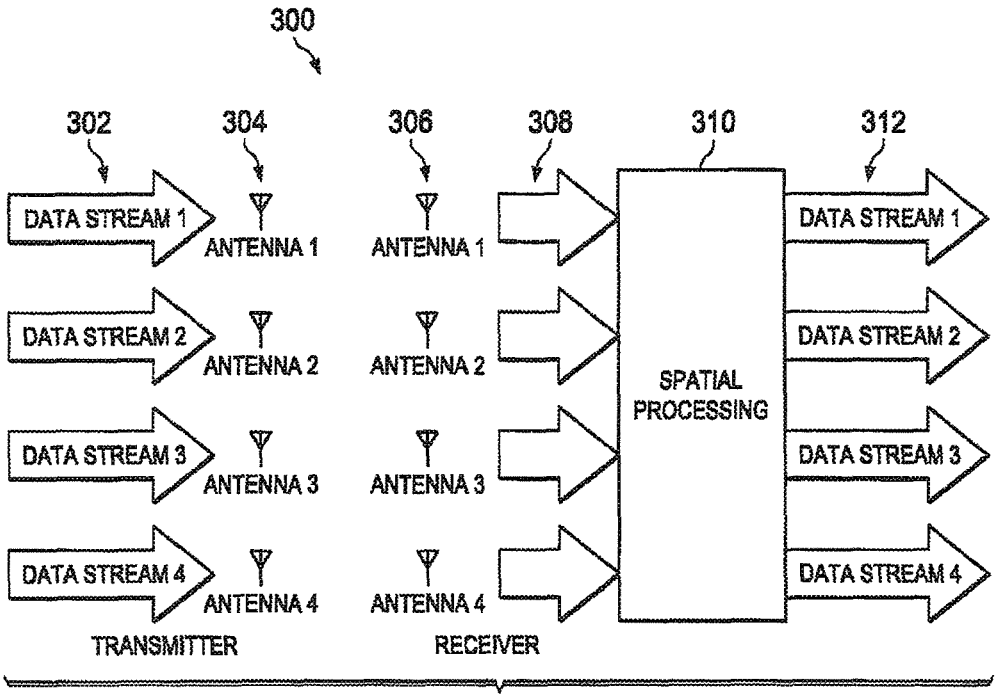
FIG. 3 illustrates a 4×4 multiple-input, multiple-output (MIMO) system according to an embodiment of the present disclosure.

FIG. 3 illustrates a 4×4 multiple-input, multiple-output (MIMO) system 300 according to an embodiment of the present disclosure. In this example, four different data streams 302 are transmitted separately using four transmit antennas 304. The transmitted signals are received at four receive antennas 306 and interpreted as received signals 308. Some form of spatial signal processing 310 is performed on the received signals 308 in order to recover four data streams 312.

An example of spatial signal processing is Vertical-Bell Laboratories Layered Space-Time (V-BLAST), which uses the successive interference cancellation principle to recover the transmitted data streams. Other variants of MIMO schemes include schemes that perform some kind of space-time coding across the transmit antennas (e.g., Diagonal Bell Laboratories Layered Space-Time (D-BLAST)). In addition, MIMO can be implemented with a transmit and receive diversity scheme and a transmit and receive beamforming scheme to improve the link reliability or system capacity in wireless communication systems.

The MIMO channel estimation consists of estimating the channel gain and phase information for links from each of the transmit antennas to each of the receive antennas. Therefore, the channel response "H" for N×M MIMO system consists of an N×M matrix, as shown below:

$$H = \begin{bmatrix} a_{11} & a_{12} & \dots & a_{1M} \\ a_{21} & a_{22} & \dots & a_{2M} \\ \vdots & \vdots & \dots & \vdots \\ a_{N1} & a_{M2} & \dots & a_{NM} \end{bmatrix}.$$

The MIMO channel response is represented by H and $a_{NM}$ represents the channel gain from transmit antenna N to receive antenna M. In order to enable the estimations of the elements of the MIMO channel matrix, separate pilots may be transmitted from each of the transmit antennas.

As an extension of single user MIMO (SU-MIMO), multi-user MIMO (MU-MIMO) is a communication scenario in which a base station with multiple transmit antennas can simultaneously communicate with multiple mobile stations through the use of multi-user beamforming schemes such as Spatial Division Multiple Access (SDMA) to improve the capacity and reliability of a wireless communication channel.

In the present disclosure, two matrix indices specify a precoder. More specifically, a matrix index specifies W1∈C1 and a matrix index specifies W2∈C2, where C1 and C2 are two codebooks. The rank of the codeword W=W1×W2 (or W2×W1) is defined as the rank of W.

For the case of W=W1×W2, codebook C1 contains codewords having the structure of:

$$\begin{bmatrix} \vec{w} & 0 \\ 0 & \vec{w} \end{bmatrix},$$

together with the identity matrix. Codebook C2 contains codewords having dimensions of: 2×1, 2×2, 8×3, 8×4, 8×5, 8×6, 8×7, and 8×8 only.

In the eight transmit (8 Tx) antenna codebook of the overall precoder (W), the maximum rank of the codeword is 8. If the number of codewords of rank "k" in the 8 Tx codebook are denoted $r_k$, then the total number of codewords in the 8 Tx codebook is:

$$\sum_{k=1}^{8} r_k.$$

In one embodiment of the disclosure, the codebook of the overall precoder (W) has the following property:

$$r_1 + r_2 = \sum_{k=3}^{89} r_k.$$

That is, the total number of codewords for rank 1 and rank 2 are the same as the total number of codewords from rank 3 to rank 8. A special example is:

$$r_1 = r_2 = \sum_{k=3}^{4} r_k = \sum_{k=5}^{8} r_k.$$

In this case, the codewords may be uniformly partitioned into four subsets: i) subset S0 contains rank 1 codewords; ii) subset S1 contains rank 2 codewords; iii) subset S2 contains rank 3 and rank 4 codewords; and iv) subset S3 contains rank 5, rank 6, rank 7, and rank 8 codewords.

In one embodiment of the disclosure, the codebook of the overall precoder (W) has the following property:

$$r_1 = \sum_{k=2}^{8} r_k \text{ and } \sum_{k=2}^{4} r_k = \sum_{k=5}^{8} r_k.$$

In a particular example, the codewords can be uniformly partitioned into four subsets: S0, S1, S2 and S3. The subset S0 contains rank 1 codewords targeted for a closely spaced, cross-pole antenna configuration with the structure of:

$$W = \begin{bmatrix} \tilde{w} & 0 \\ 0 & \tilde{w} \end{bmatrix} \begin{bmatrix} 1 \\ \alpha \end{bmatrix}, \alpha \in \{1, -1, j, -1\},$$

where the antenna group beam $\tilde{w} \in G^{(1,2)}$ and where $$G^{(k,Q)} = \bigcup_{q=0}^{Q-1} G_q^{(k,Q)}.$$

The term $G_q^{(k,Q)}$ represents the set of all k-column subsets of the DFT-based generator matrix, $G_q^{(Q)}$, having the elements:

$$\left([G_q^{(Q)}])_{mn} = \exp\left(j\frac{2\pi}{N_T/2} m\left(n + \frac{q}{Q}\right)\right), q = 0, 1, \ldots, Q-1.$$

The subset S1 contains rank 1 codewords targeted for a co-polarized, closely-spaced, uniform linear array antenna configuration with the structure of:

$$W = \begin{bmatrix} \tilde{w} & 0 \\ 0 & \tilde{w} \end{bmatrix} \begin{bmatrix} 1 \\ \alpha \end{bmatrix}, \alpha \in \{1, -1, j, -1\}, \tilde{w} \in G_q^{(1,4)}.$$

The subset S2 contains rank 2, rank 3 and rank 4 codewords. The subset S3 contains rank 5, rank 6, rank 7, and rank 8 codewords.

In one embodiment of the disclosure, the overall precoding matrices may be partitioned into K subsets, wherein a $\lceil \log_2 (K) \rceil$ bits subset indicator (SI) is reported from the mobile station to the network to indicate to which subset the recommended overall precoding matrix of the mobile station belongs.

For a particular example, the overall precoding matrices are partitioned into two subsets according to the rank of the overall precoder. When the subset indicator (SI) bit is equal to 1, the rank of the recommended overall precoder of the mobile station is greater than 2. Otherwise, when the SI bit is equal to 2, the rank of the recommended overall precoder is less than 3:

| SI | Rank of MS recommended overall precoder |
|---|---|
| 0 | 1 and 2 |
| 1 | 3 to 8 |

In another example, the overall precoding matrices are partitioned into four subsets (S0, S1, S2, and S3). Then, a 2-bit subset indicator (SI) indicates to which subset the recommended overall precoder belongs:

| SI | Subset in which MS-recommended overall precoder belongs |
|---|---|
| 00 | S0 |
| 01 | S1 |
| 10 | S2 |
| 11 | S3 |

In one embodiment of the disclosure, the mobile station reports a first PMI or W1 and a second PMI or W2 in different subframes or the same subframe, depending on the SI values. For example, in the case where SI has only one bit, as suggested in the previous embodiment: 1) when the SI value is 0, then first PMI and the second PMI may be reported in different subframes or the same subframe; and 2) when the SI value is 1, the first PMI and the second PMI are always reported in the same subframe. Furthermore, in the special case where the first PMI is always set to be the identity matrix when SI value is 1, the mobile station only needs to report the matrix index related to the second PMI.

Figure 4A:
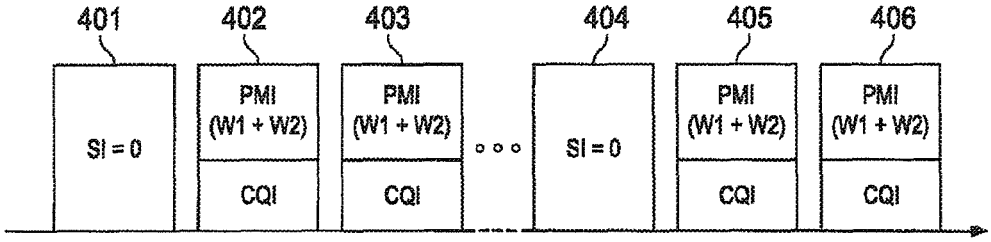
FIGS. 4A and 4B illustrate an alternative for reporting CQI, PMI, and RI in PUCCH periodic wideband feedback mode according to one embodiment of the disclosure.
Figure 4B:
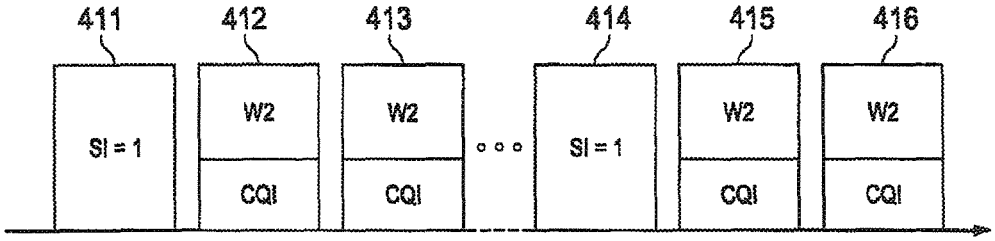

FIGS. 4A and 4B illustrate an alternative for reporting CQI, PMI, and RI in PUCCH periodic wideband feedback mode according to one embodiment of the disclosure. The mobile station transmits subframes 401-406 with the indicated feedback reports when the subset indicator (SI) is 0. The mobile station also transmits subframes 411-416 with the indicated feedback reports when the subset indicator (SI) is 1. The subset indicator (SI) is reported by the mobile station less frequently, similar to RI feedback in Rel-8. In a subframe where the mobile station is configured to report both PMI and CQI, the mobile station reports both the first PMI and the second PMI if SI=0 (as shown in FIG. 4A). However, if SI=1, the mobile station reports only the second PMI.

By way of example, subframes 401 and 404 contain the subset indicator (SI=0). Subframes 402, 403, 405, and 406 contain the first PMI and the second PMI (i.e., matrices W1 and W2), as well as the channel quality indicator (CQI) values. Subframess 411 and 414 contain the subset indicator (SI=1). Subframes 412, 413, 415, and 416 contain the second PMI values, as well as the channel quality indicator (CQI) values.

FIGS. 5-10 illustrate a plurality of alternatives for reporting CQI, PMI, and RI in PUCCH periodic wideband feedback mode when the subset indicator (SI) value is 0 according to other embodiments of the present disclosure.

Figure 5:
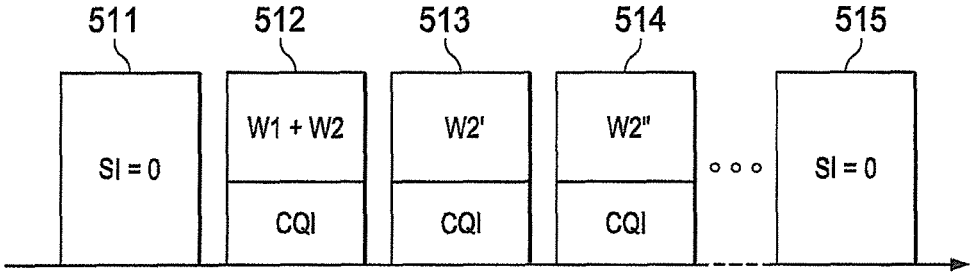
FIGS. 5-10 illustrate a plurality of alternatives for reporting CQI, PMI, and RI in PUCCH periodic wideband feedback mode when the subset indicator (SI) value is 0 according to other embodiments of the present disclosure.

In FIG. 5, the mobile station transmits subframes 511-515 with the indicated feedback reports when the subset indicator (SI) is 0. The first PMI and the second PMI are both obtained from the wideband channel (i.e., the mobile station assumes transmission on set S subbands), W2' and W2" are obtained from the wideband channel following the reporting subframe, conditioned on the last reported periodic wideband feedback of the first PMI. The reporting periodicity of both the first PMI and the second PMI in the same subframe may be configured by higher layer signaling (e.g., RRC signaling). The reporting periodicity of the first PMI and the second PMI may be multiple times the reporting periodicity of only wideband second PMI.

The CQI is computed assuming that the mobile station performs transmission on set S subbands with the currently reported first PMI and second PMI if the first PMI is configured to be reported in the feedback subframe of the currently reported second PMI and the last reported periodic wideband first PMI.

Figure 6:
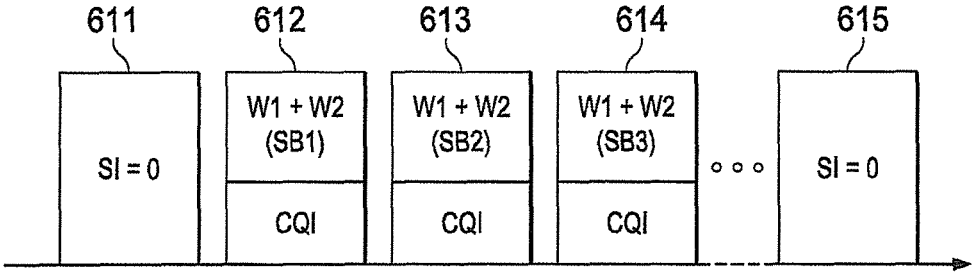

In FIG. 6, the mobile station transmits subframes 611-615 with the indicated feedback reports when the subset indicator (SI) is 0. The first PMI is obtained from the wideband channel. The mobile station assumes transmission on set S subbands. However, the second PMI (for subband SB1) is obtained assuming that the mobile station is only transmitting on the corresponding subband SB1. The CQI value is computed assuming that the mobile station performs transmission on set S subbands with the reported first PMI and the subband second PMI. In this alternative, the wideband first PMI and the subband second PMI are always transmitted in the same subframe (e.g., subframe 612).

Figure 7:
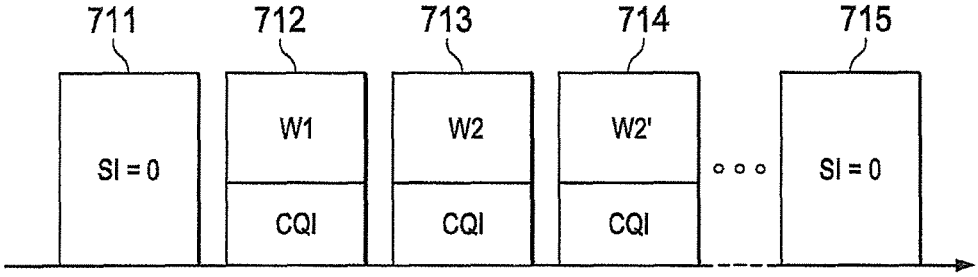

In FIG. 7, the mobile station transmits subframes 711-715 with the indicated feedback reports when the subset indicator (SI) is 0. The reporting mechanism is similar to that presented in FIG. 5. However, the difference is that the first PMI and the second PMI are not be sent in the same subframe. The CQI value is computed assuming that the mobile station performs transmission on set S subbands with the currently reported second PMI and the last reported periodic wideband first PMI.

Figure 8:
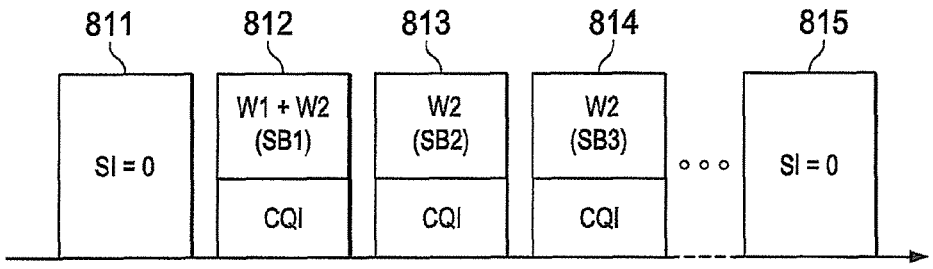

In FIG. 8, the mobile station transmits subframes 811-815 with the indicated feedback reports when the subset indicator (SI) is 0. The reporting mechanism is similar to that presented in FIG. 6 except that wideband first PMI and subband second PMI are not always sent in the same subframe. The periodicity of the subframes where the mobile station is configured to feedback both wideband first PMI and subband second PMI in the same subframe can be configured by higher layer signaling and should be multiple times the feedback periodicity of the subframes when the mobile station is configured to feedback only the subband second PMI. The CQI value is computed assuming that the mobile station performs transmission on set S subbands with the currently reported first PMI and the subband second PMI if the first PMI is configured to be reported in the feedback subframe of the currently reported subband second PMI and the last reported periodic wideband first PMI.

Figure 9:
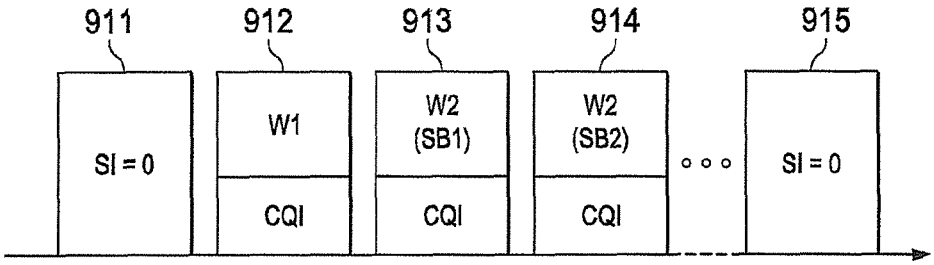
Figure 10:
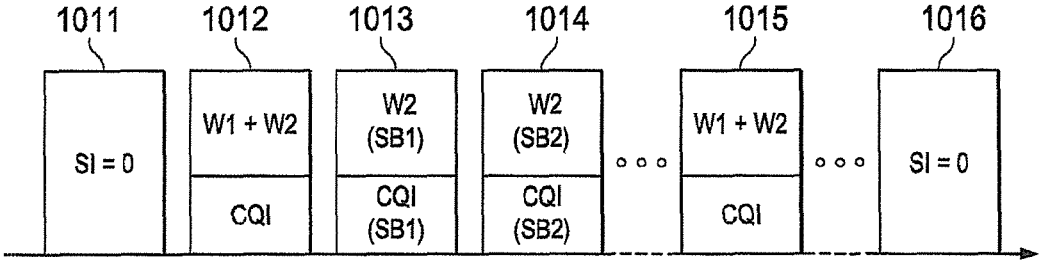

In FIG. 9, the mobile station transmits subframes 911-915 with the indicated feedback reports when the subset indicator (SI) is 0. The reporting mechanism is similar to that presented in FIG. 6, except that the wideband first PMI and the subband second PMI are never sent in the same subframe. The periodicity of the subframes where the mobile stations is configured to feedback the wideband first PMI may be configured by higher layer signaling and may be multiple times the feedback periodicity of the subframes when the mobile station is configured to feedback only the subband second PMI. The CQI is computed assuming that the mobile station performs transmission on set S subbands with the currently reported subband second PMI and the last reported periodic wideband first PMI.

In an advantageous embodiment of the present disclosure, the mobile station feeds back the subband second PMI in those cases where the mobile station is also configured to feed back the CQI value for selected subbands (i.e., mobile station selected subband CQI). For example, in FIG. 7, the mobile station transmits subframes 1011-1015 with the indicated feedback reports when the subset indicator (SI) is 0. In subframes 1013 and 1014, where the mobile station is configured to feedback the subband CQI value (e.g., CQI SB1), the mobile station will also report the corresponding subband second PMI (e.g., W2 SB1).

In the subframes where the mobile station is configured to feed back wideband PMI/CQI (e.g., subframe 1012), the mobile station may use a method proposed in one of FIGS. 4-9. However, for the subframe where the mobile station is configured to feed back the subband CQI value, the mobile station will also feed back the corresponding subband second PMI, together with the reported subband CQI values.

Advantageously, combining the subband CQI value and the subband PMI value (i.e., the second PMI) in the same subframe reduces the size of the overhead. This is because separating PMI into a first PMI and a second PMI allows the second PMI to be combined with CQI using a reasonable payload and increases the overall granularity of the first PMI and the second PMI.

In Release 8, the codebook for the PUCCH is the same as the codebook for the PUSCH. In an advantageous embodiment of the disclosure, different codebook granularity may be used for PUCCH feedback and PUSCH feedback. Accordingly, the codebooks for the PUCCH feedback and PUSCH feedback are different. For example, the codebooks on which PUCCH feedback is based are subsets of the codebooks on which PUSCH feedback are based. More specifically, in the dual codebook structure, the PUSCH and PUCCH codebooks have the following relationship: $C_1^{PUCCH} \subset C_1^{PUSCH}$ and $C_2^{PUCCH} \subset C_2^{PUSCH}$, where $C_i^{PUCCH}$ is the codebook defined for matrix Wi for PUCCH feedback and $C_i^{PUSCH}$ is the codebook defined for matrix Wi for PUSCH feedback.

Alternatively, the PUSCH and PUCCH codebooks may have the following relationship: $C_1^{PUCCH} \subset C_1^{PUSCH}$ and $C_2^{PUCCH} \subset C_2^{PUSCH}$. This allows for the possibility that both PUCCH and PUSCH feedback have the same feedback granularity for wideband feedback. The codebook of PUCCH can be subset-restricted from that of the PUSCH codebook. The restricted subset could be signaled through higher layer signaling, and mechanisms to perform a restricted subset could reuse the same ones defined in Rel-8.

Furthermore, the codebook restriction for PUCCH may have the property that the restricted codebook will have the same property as that for the PUSCH feedback (non-restricted codebook) in terms of the payload relationship. Because the PUSCH is used for data transmission, using the PUSCH for feedback allows for a higher payload for the feedback as compared to using the PUCCH. For example, if the non-restricted codebook has the property, $$r_1 + r_2 = \sum_{k=3}^{8} r_i,$$

then the restricted codebook for PUCCH feedback should have the property.

$$r_1' + r_2' = \sum_{k=3}^{8} r_k',$$

where $r_i'$ stands for the number of overall precoding matrices which have rank i in the restricted codebook for PUCCH feedback.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. For use in a wireless network, a mobile station comprising:

*at least one antenna; and* a transmitting unit *coupled to the at least one antenna and* configured to transmit, *via the at least one antenna,* feedback values in a physical uplink control channel (PUCCH) to a base station of the wireless network;

wherein the mobile station is configured to transmit to the base station a subband precoder matrix index (PMI) associated with a particular subband and a subband channel quality indicator (CQI) value associated with the particular subband together in a first subframe of the PUCCH;

wherein the particular subband comprises one of multiple subbands that are divided into multiple subsets, the subset to which the particular subband belongs identified by a subset indicator; and wherein the mobile station is configured to selectively transmit a wideband PMI to the base station in the first subframe, in a second subframe, or not at all depending on the subset indicator and content of the wideband PMI.

2. The mobile station as set forth in claim 1, wherein the mobile station is further configured to transmit to the base station a wideband CQI value in the PUCCH.

3. The mobile station as set forth in claim 2, wherein a period at which the mobile station transmits the wideband PMI and the wideband CQI value is a multiple of a period at which the mobile station transmits the subband PMI and the subband CQI value.

4. The mobile station of claim 1, wherein:

the mobile station is configured to transmit the wideband PMI in the first subframe when the subset indicator has a first value; and the mobile station is configured to transmit the wideband PMI in the second subframe when the subset indicator has a second value.

5. The mobile station of claim 1, wherein the mobile station is configured to not transmit the wideband PMI to the base station when then wideband PMI is an identity matrix and the subset indicator has a specified value.

6. A method of operating a mobile station, the method comprising:

transmitting to a base station a subband precoder matrix index (PMI) associated with a particular subband and a subband channel quality indicator (CQI) value associated with the particular subband together in a first subframe of a physical uplink control channel (PUCCH); and selectively transmitting a wideband PMI to the base station in the first subframe, in a second subframe, or not at all depending on a subset indicator and content of the wideband PMI;

wherein the particular subband comprises one of multiple subbands that are divided into multiple subsets, the subset to which the particular subband belongs identified by the subset indicator.

7. The method as set forth in claim 6, further comprising:

transmitting to the base station a wideband CQI value in the PUCCH.

8. The method as set forth in claim 7, wherein a period at which the mobile station transmits the wideband PMI and the wideband CQI value is a multiple of a period at which the mobile station transmits the subband PMI and the subband CQI value.

9. The method of claim 6, wherein selectively transmitting the wideband PMI to the base station comprises:

transmitting the wideband PMI to the base station in the first subframe when the subset indicator has a first value; and transmitting the wideband PMI to the base station in the second subframe when the subset indicator has a second value.

10. The method of claim 6, wherein selectively transmitting the wideband PMI to the base station comprises:

not transmitting the wideband PMI to the base station when then wideband PMI is an identity matrix and the subset indicator has a specified value.

11. For use in a wireless network, a base station comprising:

*at least one antenna; and* a receiving unit *coupled to the at least one antenna and* configured to receive from a mobile station, *via the at least one antenna,* feedback values transmitted in a physical uplink control channel (PUCCH);

wherein the base station is configured to receive a subband precoder matrix index (PMI) associated with a particular subband and a subband channel quality indicator (CQI) value associated with the particular subband together in a first subframe of the PUCCH;

wherein the particular subband comprises one of multiple subbands that are divided into multiple subsets, the subset to which the particular subband belongs identified by a subset indicator; and wherein the base station is configured to selectively receive a wideband PMI from the mobile station in the first subframe, in a second subframe, or not at all depending on the subset indicator and content of the wideband PMI.

12. The base station as set forth in claim 11, wherein the base station is further operable to receive from the mobile station a wideband CQI value in the PUCCH.

13. The base station as set forth in claim 12, wherein a period at which the base station receives the wideband PMI and the wideband CQI value is a multiple of a period at which the base station receives the subband PMI and the subband CQI value.

14. The base station of claim 11, wherein:

the base station is configured to receive the wideband PMI in the first subframe when the subset indicator has a first value; and the base station is configured to receive the wideband PMI in the second subframe when the subset indicator has a second value.

15. The base station of claim 11, wherein the base station is configured to not receive the wideband PMI from the mobile station when then wideband PMI is an identity matrix and the subset indicator has a specified value.

16. A method of operating a base station, the method comprising:

receiving from a mobile station a subband precoder matrix index (PMI) associated with a particular subband and a subband channel quality indicator (CQI) value associated with the particular subband together in a first subframe of a physical uplink control channel (PUCCH); and selectively receiving a wideband PMI from the mobile station in the first subframe, in a second subframe, or not at all depending on a subset indicator and content of the wideband PMI;

wherein the particular subband comprises one of multiple subbands that are divided into multiple subsets, the subset to which the particular subband belongs identified by the subset indicator.

17. The method as set forth in claim 16, further comprising:

receiving from the mobile station a wideband CQI value in the PUCCH.

18. The method as set forth in claim 17, wherein a period at which the base station receives the wideband PMI and the wideband CQI value is a multiple of a period at which the base station receives the subband PMI and the subband CQI value.

19. The method of claim 16, wherein selectively receiving the wideband PMI from the mobile station comprises:

receiving the wideband PMI from the mobile station in the first subframe when the subset indicator has a first value; and receiving the wideband PMI from the mobile station in the second subframe when the subset indicator has a second value.

20. The method of claim 16, wherein selectively receiving the wideband PMI from the mobile station comprises:

not receiving the wideband PMI from the mobile station when then wideband PMI is an identity matrix and the subset indicator has a specified value.

*21. A system, comprising:*

*a mobile station configured to determine feedback values; and*

*a transmitting unit within the mobile station, the mobile station configured to transmit the feedback values to a base station, wherein the feedback values include,*

*in a first subframe, a channel quality indicator (CQI) for a subset of two or more subbands and a precoder matrix indicator (PMI) selected from a codebook subset for transmission over the subset of subbands, and*

*in a second subframe, a value indicating a subband of the subset of subbands and CQI for the indicated subband.*

*22. The mobile station as set forth in claim 21, wherein the mobile station is further configured to transmit the value indicating the subband of the subset of subbands to the base station in a physical uplink control channel (PUCCH).*

*23. The mobile station as set forth in claim 22, wherein a period at which the mobile station transmits the CQI for the subset of subbands and the PMI is a multiple of a period at which the mobile station transmits the value indicating the subband of the subset of subbands.*

*24. A method of operating a mobile station, the method comprising:*

*transmitting, from the mobile station to a base station in a first subframe, a channel quality indicator (CQI) for a subset of subbands and a precoder matrix indicator (PMI) selected from a codebook subset for transmission over the selected subset of subbands; and*

*transmitting, from the mobile station to the base station in a second subframe, a value indicating a subband of the subset of subbands and CQI for the indicated subband.*

*25. The method as set forth in claim 24, further comprising:*

*transmitting the value indicating the subband of the subset of subbands to the base station in a physical uplink control channel (PUCCH).*

*26. The method as set forth in claim 25, wherein a period at which the mobile station transmits the CQI for the subset of subbands and the PMI is a multiple of a period at which the mobile station transmits the value indicating the subband of the subset of subbands.*

*27. A system, comprising:*

*a base station configured to process received signals; and*

*a receiving unit within the base station, the receiving unit configured to receive feedback values from a mobile station, wherein the feedback values include,*

*in a first subframe, a channel quality indicator (CQI) for a subset of two or more subbands and a precoder matrix indicator (PMI) selected from a codebook subset for transmission over the subset of subbands, and*

*in a second subframe, a value indicating a subband of the subset of subbands and CQI for the indicated subband.*

*28. The system as set forth in claim 27, wherein the base station is further configured to receive the value indicating the subband of the subset of subbands from the mobile station in a physical uplink control channel (PUCCH).*

*29. The system as set forth in claim 27, wherein a period at which the base station receives the CQI for the subset of subbands and the PMI is a multiple of a period at which the mobile station transmits the value indicating the subband of the subset of subbands.*

*30. A method of operating a base station, the method comprising:*

*receiving, from a mobile station at the base station in a first subframe, a channel quality indicator (CQI) for a subset of two or more subbands and a precoder matrix indicator (PMI) selected from a codebook subset for transmission over the subset of subbands; and*

*receiving, from the mobile station at the base station in a second subframe, a value indicating a subband of the subset of subbands and CQI for the indicted subband.*

*31. The method as set forth in claim 30, further comprising:*

*receiving the value indicating the subband of the subset of subbands at the base station in a physical uplink control channel (PUCCH).*

*32. The method as set forth in claim 31, wherein a period at which the base station receives the CQI for the subset of subbands and the PMI is a multiple of a period at which the mobile station transmits the value indicating the subband of the subset of subbands.*

* * * * *